United States Patent
Soferman et al.

(10) Patent No.: US 8,862,758 B1
(45) Date of Patent: *Oct. 14, 2014

(54) SYSTEM AND METHOD FOR CONTROLLING ONE OR MORE MEDIA STREAM CHARACTERISTICS

(75) Inventors: Ziv Soferman, Givataylm (IL); Yohay Falik, Rananna (IL)

(73) Assignee: ClearOne Communications Hong Kong, Limited, Salt Lake City, UT (US)

( * ) Notice: Subject to any disclaimer, the term of this patent is extended or adjusted under 35 U.S.C. 154(b) by 2238 days.

This patent is subject to a terminal disclaimer.

(21) Appl. No.: 10/693,036

(22) Filed: Oct. 23, 2003

Related U.S. Application Data

(60) Provisional application No. 60/502,360, filed on Sep. 11, 2003.

(51) Int. Cl.
G06F 15/16 (2006.01)

(52) U.S. Cl.
USPC .......................................... 709/231; 709/224

(58) Field of Classification Search
USPC ........................................................ 709/231
See application file for complete search history.

(56) References Cited

U.S. PATENT DOCUMENTS

| | | | | |
|---|---|---|---|---|
| 6,081,843 A * | 6/2000 | Kilkki et al. | | 709/232 |
| 7,423,990 B2 * | 9/2008 | Kelton et al. | | 370/329 |
| 7,496,675 B2 * | 2/2009 | Obata et al. | | 709/231 |
| 2002/0150123 A1 * | 10/2002 | Ro | | 370/465 |
| 2003/0061305 A1 * | 3/2003 | Copley et al. | | 709/217 |
| 2003/0123546 A1 | 7/2003 | Falik et al. | | |
| 2003/0198184 A1 * | 10/2003 | Huang et al. | | 370/231 |
| 2004/0153951 A1 * | 8/2004 | Walker et al. | | 714/776 |
| 2004/0156624 A1 * | 8/2004 | Kent et al. | | 386/125 |

OTHER PUBLICATIONS

Birney, Reducing Broadcast Delay, Microsoft Corporation, Apr. 2003, http://www.microsoft.com/windows/windowsmedia/howto/articles/broadcastDelay.aspx.

Westerink et al., Two-pass MPEG-2 variable-bit-rate encoding, IBM Journal of Research and Development, vol. 43(4), Jul. 1999.

* cited by examiner

*Primary Examiner* — Mohamed Ibrahim
(74) *Attorney, Agent, or Firm* — TraskBritt, P.C.

(57) ABSTRACT

The invention provides controllers systems and methods that apply techniques for determining media stream characteristics that propagate through a sequence of buffers. One of the buffers represents buffering characteristics of a network through which the media stream propagates. The media stream may include packets of a media stream and the network may include a wireless network.

40 Claims, 8 Drawing Sheets

211

231

SYSTEM AND METHOD FOR CONTROLLING ONE OR MORE MEDIA STREAM CHARACTERISTICS

RELATED APPLICATIONS

This application claims the benefit of U.S. provisional patent application Ser. No. 60/502,360 filed 11 Sep. 2003 titled "System and method for controlling one or more media streams characteristics.

FIELD OF THE INVENTION

The invention relates to systems and methods for controlling media stream characteristics of a media stream that propagates via multiple buffers.

BACKGROUND

Digital video must be extensively compressed prior to transmission and storage, as each picture includes multiple pixels, and each pixel is associated with multiple multi-bit values.

In a typical scenario, a non-compressed media stream (also referred as "raw" media stream) includes a sequence of substantially equal frames. These frames are eventually presented at a constant rate. As described below, once the media stream is compressed, the size of frames may vary. The transmission of a varying size frame media stream over a network may cause timing problems, as these frames must be provided in a timely manner to a media player.

Various compression standards, such as but not limited to the MPEG standards enable efficient storage and transmission of media information.

Spatial compression usually includes transform coding, quantization and variable length encoding. Transform coding is operable to convert a group of picture pixels to a set of DCT (discrete cosine transform) coefficients, the DCT coefficients of a block (representative of a predefined amount of picture pixels, such as 8×8 pixels) are then quantized and are represented by pairs of amplitude/run-length, whereas the run-length value indicates the number of zeroes between two non-zero coefficients. The amplitude/run-length pairs of a macro-block are coded by a variable length-coding scheme to provide compressed video streams.

Temporal compression is based upon the fact that there is usually little difference between consecutive video frames. A compressed media stream includes many sequences of temporally compressed frames, each sequence initiates by a self-contained key-frame (that is independent of preceding frames) that is followed by several Inter-frames. Each Inter-Frame includes a difference between itself and at least another frame.

As a result of the compression schemes access units of complex scenes (for example, scenes of low temporal redundancy and/or low spatial redundancy) are represented by more bits than other access units. MPEG-4 presentations include a number of media elementary streams, such as video elementary streams and audio elementary streams. Each media elementary stream includes multiple access units (e.g.—samples). An access unit is a coded representation of a presentation unit. An audio access unit is the coded representation of an audio frame, while a video access unit includes the data required for presentation of a picture.

An MPEG-4 presentation may be provided to a client device in a streaming mode or in a download mode. A typical client device has a player buffer and a client player. In a download mode the presentation is stored at the client device memory (such as the client buffer) and can be later fetched from the memory and processed (by the client player) to enable the display of that presentation. In streaming mode the client device displays the streamed presentation. In the streaming mode, there is a need to match between the bit rates of the streaming elementary streams, the available bandwidth for streaming these elementary streams over a communication network and the client processing and/or buffering capabilities.

Mismatches may result in client buffer (also termed target buffer or player buffer) over-flow (in which the client device receives too much information and must throw away a part of the information) or in a client buffer under-flow (in which the client device does not receive enough information to enable a smooth and/or continuous display of the presentation). Furthermore, as various elementary streams are streamed to the client device, a bit-rate mismatch may result in loss of synchronization between ideally synchronized elementary streams. Typically, over-flow is easier to prevent.

Media streams can be transmitted over a network at a constant bit rate (CBR) or at a varying bit rate (VBR). CBR requires a compression of an access unit by a compression ratio ($Q_{SCALE}$) that is responsive to the size of that access unit, as larger access units must be compresses at a higher compression ration than smaller access units in order to achieve a substantially constant bit rate. VBR usually does not require such a relation between its compression ratio and the size of its access units, but may cause temporal timing and buffering problems.

Four scientists from the University of Southern California developed a technique named "Multi Threshold Flow Control (MTFC)" that is described at "multi-threshold online smoothing technique for variable rate streams", R. Zimmerman, K. Fu, M. Jaharangiri and C. Shahabi". The article was found at the web site of the university (www.usc.edu).

MTFC smoothes variable bit rate (VBR) transmissions from a server to a client, without a priori knowledge of the actual bit rate. MTFC utilizes multi-level buffer thresholds at the client side that trigger feedback information sent to the media server. Once a client buffer threshold is crossed it initiates a feedback process that in turn adjusts the sending rate of the server. The feedback process is based upon a prediction of futuristic bit rate consumption. Three bit rate consumption algorithms were suggested, one being a fuzzy logic based algorithm.

SUMMARY OF THE INVENTION

The invention provides a method for determining at least one characteristic of a media stream that propagates through at least three cascaded buffers, the method includes the steps of: providing status information reflecting a status of at least a third buffer and a second buffer of said at least three buffers; and applying at least one non-fuzzy process to determine the at least one characteristic of the media stream, in response to the status information; whereas at least one cascaded buffer reflects buffering properties of a network through which the media stream propagates.

The invention provides a method for determining multiple media stream characteristics of a media stream that propagates through at least two cascaded buffers, the method includes the steps of: providing status information reflecting a status of at least two cascaded buffers; and applying at least one non-fuzzy process to determine multiple characteristics of the media stream, in response to the status information;

wherein at least one cascaded buffer reflects buffering properties of a network through which the media stream propagates.

The invention provides a controller for determining at least one media stream characteristic of a media stream that propagates through at least three cascaded buffers, the controller includes: an interface, for receiving status information reflecting a status of at least a third buffer and a second buffer of said at least three buffers; and a non-fuzzy decision making block, connected to the interface, for processing the status information by applying a non-fuzzy process, to provide output representative of at least one media stream characteristic of the media stream; wherein at least one cascaded buffer reflects buffering properties of a network through which the media stream propagates.

The invention provides a controller for determining multiple media stream characteristic of a media stream that propagates through at least two cascaded buffers, the controller includes: an interface, for receiving status information reflecting a status of at least a first and second buffers of said at least two buffers; a non-fuzzy decision making block, connected to the interface, for processing the status information to provide an output representative of multiple media stream characteristics of the media stream; wherein at least one cascaded buffer reflects buffering properties of a network through which the media stream propagates.

The invention provides system for transmitting a media stream towards an intermediate buffer that represent buffering characteristics of a network, towards a target buffer, the system includes: a status information providing means, for providing status information reflecting a status of at least the target buffer and the intermediate buffer; a controller, connected to the status information providing means, for applying at least one non-fuzzy process to determine at least one media stream characteristic, in response to the status information; and media stream provider, for transmitting at least a media stream portion in response to the at least one media stream characteristic.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION

Figure 1:
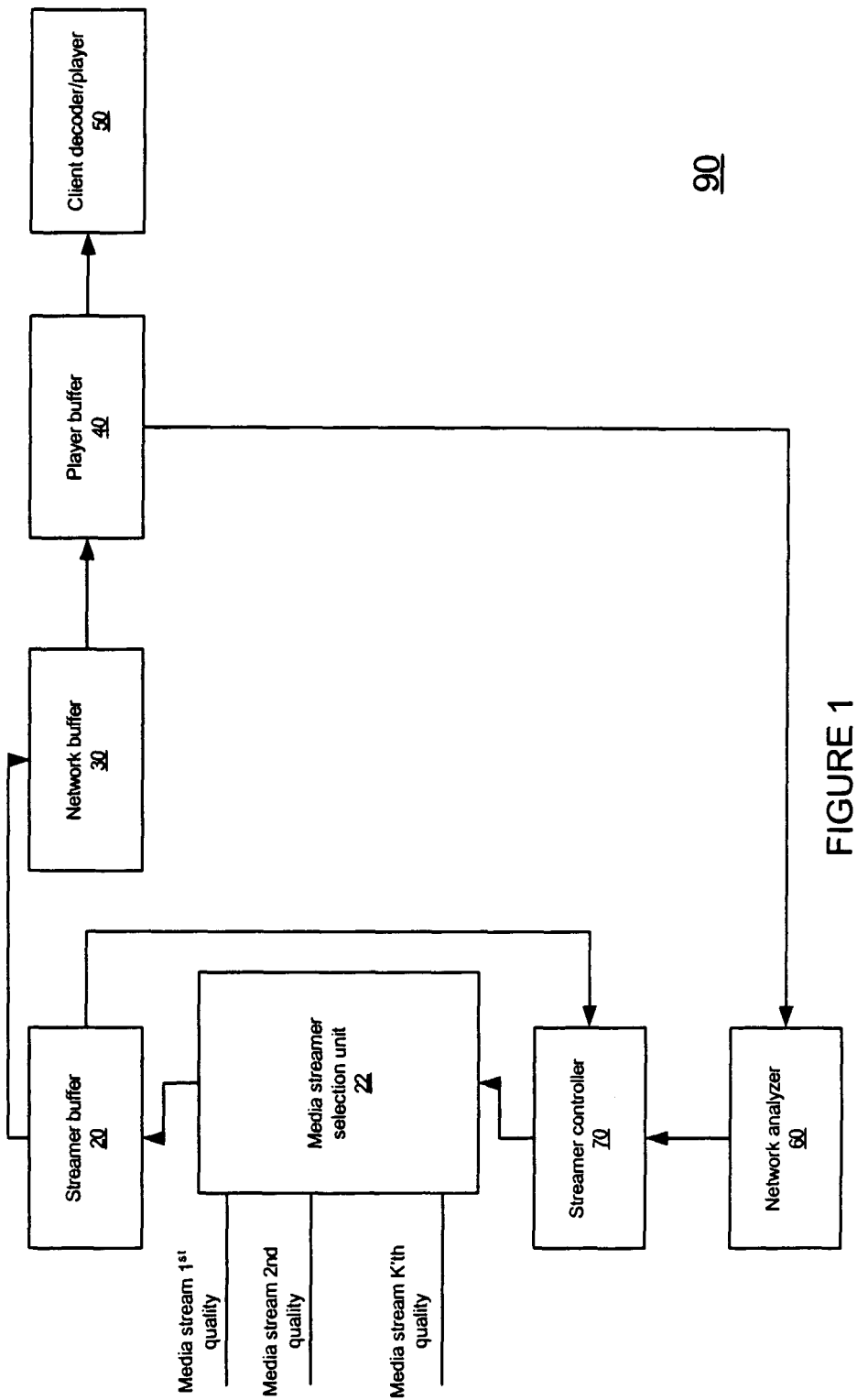
FIG. 1 is a schematic illustration of a model of a system for providing media streams to a client, in accordance with an embodiment of the invention.

According to embodiments of the invention the media stream is a media stream that is streamed from a streamer buffer, through at least one network that has buffering characteristics, towards a client buffer. The client buffer is accessed by a media stream decoder that decodes the media streams in accordance with timing information such as presentation time stamps (PTS) embedded within the media stream packets. For convenience of explanation the drawing and the related description refer to these embodiments.

The inventors found that cellular networks such as GPRS network can be modeled by a backbone buffer and an access buffer, and that both buffers can be modeled as a single network buffer. The GPRS network is used to convey media streams over a cellular network to a client device such as a handset equipped with a client buffer and a player decoder that are connected to each other.

Various embodiments of the invention are based upon status reports sent from the player device. The reports may include details about media stream packets that were received by the player buffer and in some cases even the media stream packets that were retrieved from the player buffer. The streamer may store a table that includes information about transmitted media stream packets, such as ID, length and/or timestamps (such as Playing Time Stamp and Transmission Time stamp—transmittal time from the streamer buffer). This information may be transmitted periodically and/or in response to certain events. These reports enable estimation of network buffer status as well as player buffer status.

The inventors used a model of at least three cascaded buffers. According to an embodiment of the invention the first buffer, and especially its occupancy levels are irrelevant, thus a dual cascaded buffer model can be used. In the latter representation the third buffer of the three buffer model may become a second buffer of the dual buffer model, the second buffer of the three buffer model becomes the first buffer of the dual buffer model and the retrieval rate from the first buffer of the three buffer model becomes the provision rate to the first buffer of the dual buffer model. Thus a dual buffer model may include the network buffer (as the first buffer) and a client buffer (as a second buffer). The buffer of the streamer is omitted. It is also noted that the dual buffer model, as well as the three buffer model can be expanded to a model that include more than two or three buffers.

The various embodiments of the invention use non-fuzzy logic control schemes. Thus, they do not perform the following sequence: receive crisp input variables, fuzzify the crisp input variables to provide fuzzy input variables, apply a fuzzy rule base decision to provide fuzzy output variables and defuzzify the fuzzy output variable to provide crisp output variables.

Each process has an interface for receiving input variables and providing them to the non-fuzzy decision making block, as well to other units of the processes (for example—adders, subtracting unit, encoding level blocks). These interfaces can be embedded within some of the blocks, but this is not necessarily so. For simplicity of explanation these interfaces are not illustrated.

FIG. 1 illustrates a system 90 for providing media streams to a client, in accordance with an embodiment of the invention.

System 90 includes a network analyzer 60 that is connected to a player buffer 40 (also termed target buffer) and to a controller (e.g.—"streamer controller") 70. System 10 also includes a media stream selection unit 22 that is connected to controller 70, to streamer buffer 20 and to a source (not shown) of a media stream. The media stream source can provide media streams of different quality.

FIG. 1 illustrates a scenario in which the media stream source generates multiple versions of the same media stream.

The versions may differ by their encoding level. It is noted that encoding levels are usually defined to comply with a certain bandwidth constraints and/or processing capabilities.

According to an embodiment of the invention each version may be independently processed, while according to other embodiments of the invention the media stream is represented by a basic level representation and one or more enhancement layers. An enhancement layer reflects the difference between a media stream of a certain compression level and the basic layer. If enhancement layers are used, the selection process involves selecting the basic layer and then one or more enhancement layers. It is noted that the invention can also be implemented in conjunction with various encoding methods, such as but not limited to MDC (multiple descriptive coding), in which a certain content is encoded to provide multiple representations of said content. Each representation may be used to reconstruct the content, but if multiple representations are provided to an encoder the quality of the reconstructed content is improved. MDC is known in the art, thus does not need additional description.

The method is also capable of being implemented with yet further coding schemes. For example, encoding separate components of a media stream in different manners. These components may include background, video, audio, 3D animation etc. each component is encoded separately. In such a scenario the "encoding level" is implemented in a broader sense namely, the more bandwidth is available, the more components are transmitted, or else they are just omitted.

According to other embodiments of the invention the media stream is represented by various versions, these version may vary by their size, but the size difference may result from various processing steps that differ than compression. For example, they may differ by their error correction characteristics. At least one version of the media stream may be larger than the media stream itself.

The media streamer selection unit 22 selects which version to send to the streamer buffer 20. The decision is made either periodically and/or in response to predefined events.

When such a selection involves switching between versions of a media stream, there are various prior art methods for seamless switching that may be utilized. One being switching at independently decodable frames, such as MPEG key frames. According to an another embodiment of the invention the switch can be made at arbitrary points of the media stream, by using the system and methods that is described at U.S. patent application Ser. No. 10/209,889 titled "Scalable Multi-level video coding", filed at 2 Aug. 2002 that is incorporated herein by reference.

According to an embodiment of the invention the media stream source does not provide multiple versions of the same media streams but is capable of changing the encoding level of a media stream in response to control signals from a controller. In this embodiment the media stream selection unit 22 may be omitted, as the switching operation is replaced by encoding operations executed by the source. It is noted that according to an embodiment of the invention the encoding levels may be continuous rather then discrete. Such change in encoding level can be found in live encoding or FGS-fine granularity scalability in MPEG-4 standard.

Streamer buffer 20, network buffer 30 (also termed intermediate buffer) and player buffer 40 are connected to each other to provide a cascade of buffers. Media stream packets are sent to the streamer buffer 20 from unit 22 are later retrieved from the streamer buffer 20 at a streaming rate denoted $R_S(n)$, whereas index n is a positive integer. These packets are received by at least one network that is modeled by network buffer 30, to be retrieved at a network rate denoted $R_N(n)$. The media stream packets are received at the player buffer 40 to be retrieved to a client decoder/player 50 according to timing information associated with these packets.

The media stream selection unit 22 and the streamer buffer 20 form a media stream provider, for transmitting media stream packets in response to the outputs from the controller 70. As mentioned above, the media streamer selection unit 22 may be replaced by media encoders/compressors.

It is noted that although FIG. 1 describes a media stream selector 22 that receives fully processed (or otherwise fully encoded) versions of the media streams and selects one of the versions, this is not necessarily so. According to an embodiment of the invention part of the media stream can be stored in a compressed form while the other provided to a compressor (or encoder that is not shown) during the retrieval of the compressed part. According to yet another embodiment of the invention, the media stream versions can be stored in a partially compressed form, to be fully compressed during the selection and transmission steps. A partially compressed media stream can include a media stream that is associated with motion vectors, but this is not necessarily so.

First Embodiment

According to a first embodiment of the invention a first control scheme is provided. This control scheme aims to maintain the network buffer slightly filled (almost empty) and maintain the player buffer partially full. In such a state packets that enter the network buffer 30 are not unduly delayed, and the chances of player buffer overflow or underflow are reduced. The player buffer has to be about half full, but this is not necessarily so. It is noted that avoiding network buffer overflow is of higher priority than preventing network buffer underflow.

The first control scheme includes two non-fuzzy processes. The first process receives as input information representative of the occupancy of the network buffer and outputs a variable representative of a change in the streaming rate.

The second process receives as input information relating to the status of packetized media streams that were transmitted from the media streamer and outputs a variable representing an encoding level of media stream.

Figure 2:
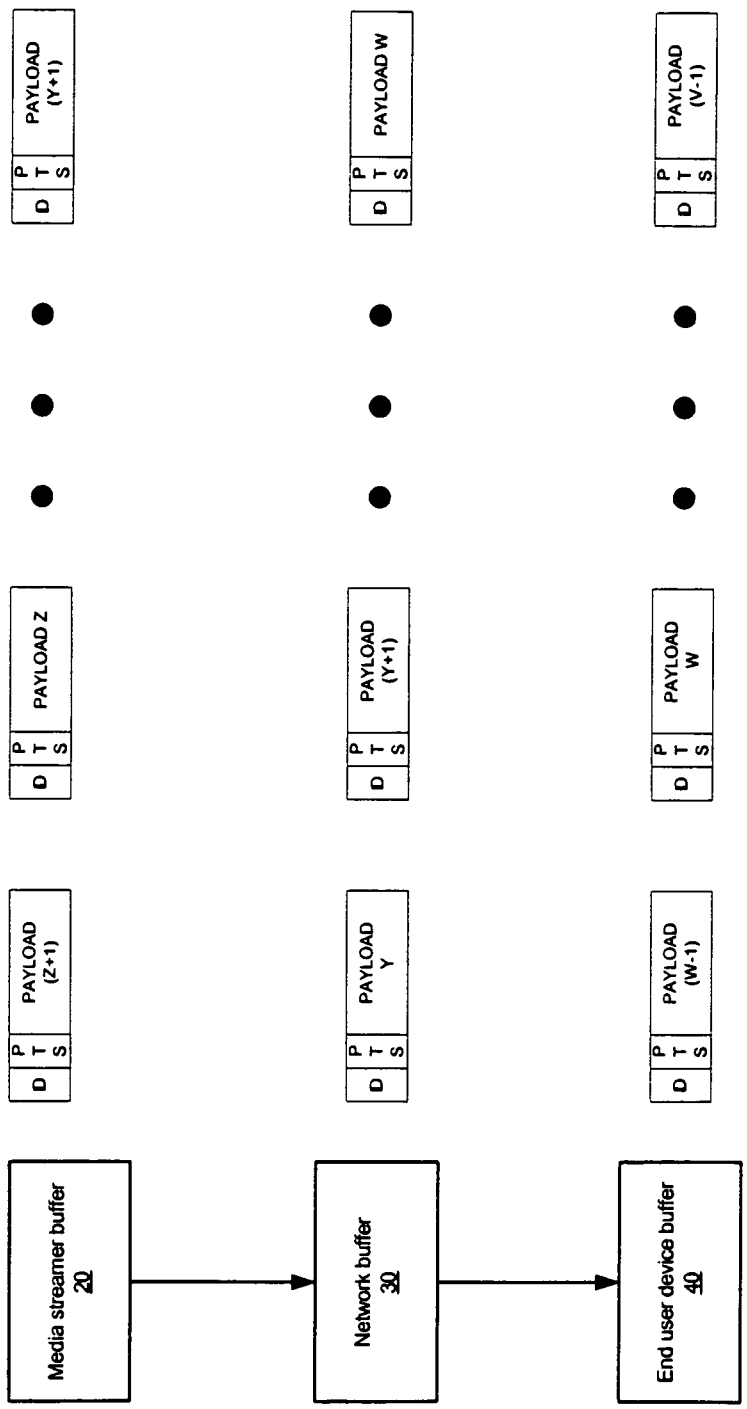
FIG. 2 is a schematic illustration of an exemplary status of packets within a streamer buffer, a network buffer and a player buffer, in accordance with an embodiment of the invention.

FIG. 2 illustrates an exemplary status of media stream packets within streamer buffer 20, network buffer 30 and player buffer 40. Streamer buffer 20 stores the $(Z+1)^{th}-(Y+1)^{th}$ packets of the media stream. Network buffer 30 stores the $Y^{th}-W^{th}$ packets of the media stream. Player buffer 40 stores the $(W-1)^{th}-(V-1)^{th}$ packets of the media stream. The client player/encoder currently processes the $(V-2)^{th}$ packet of the media stream. Each media stream packet includes an identification field (denoted ID) and a timing information field (denoted PTS).

As illustrated in FIG. 1, the player buffer 40 (or other client device entity) transmits to the network analyzer 60 a status report relating to the media stream packets that are stored within player buffer 40. This report may include the ID of the last packet that was buffered (such as W−1, in the case illustrated in FIG. 2), or the PTS of that packet ($PTS_{W-1}$), the ID of the packet that was last sent to the player (V−2). The report may include only a portion of said information but may also include additional information. Usually, either the packet ID or PTS are transmitted, as the streamer is aware of the mapping between them.

Those of skill in the art will appreciate that other report formats may provide adequate information, such as transmitting the occupancy of the player buffer or a representation of said occupancy (for example a buffer occupancy threshold that is passed). For simplicity of explanation it is assumed that the ID of last buffered packet is transmitted and its corresponding timing is known (it is either transmitted by the client buffer or stored within the streamer before it is transmitted over the network).

Figure 3:
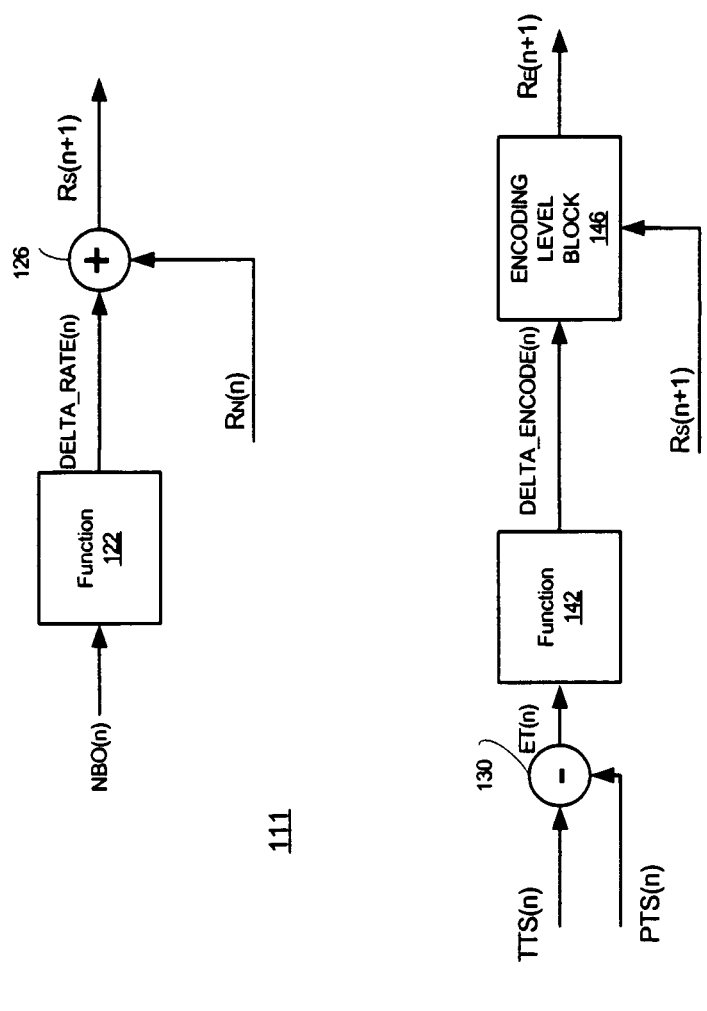
FIG. 3 is a detailed schematic illustration of two non-fuzzy processes, in accordance with an embodiment of the invention.
Figure 6A:
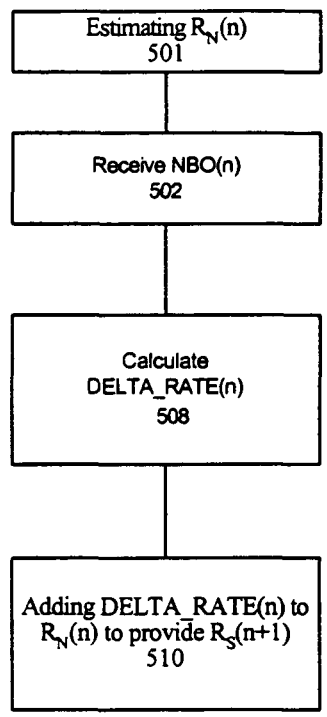
FIGS. 6a-6a, 7a-7b and 8 are flow charts diagrams of non-fuzzy processes, in accordance with embodiments of the invention.
Figure 6B:
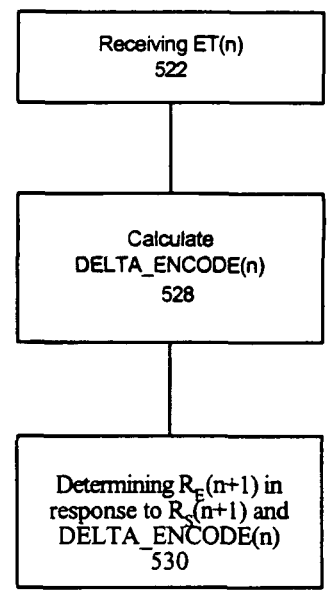

We now refer to FIGS. 3,6a and 6b that illustrate in greater details the two mentioned above processes.

The first process 111 (of FIG. 3) receives (step 502 of FIG. 6a) an input variable NBO(n) representing the current occupancy of network buffer 30, as estimated from the difference between the next packet that is supposed to be received at the player buffer 40 (driven from client buffer status reports) and the last packet that was sent from the streamer buffer 20. The process is executed in intervals and "n" is a positive integer that denotes a serial number of an interval. Referring to FIG. 2, this difference is responsive to the aggregate size of the $Y^{th}$–$W^{th}$ media stream packets. The network buffer occupancy may also be defined in response to timing information associated with the media packets that it stores. For example, it may reflect the difference ($PTS_{W-1}$–$PTS_{V-1}$) between the PTS of the $(W-1)^{th}$ packet and the PTS of the $(V-1)^{th}$ packet.

Non-fuzzy decision making block (denoted function 122) calculates DELTA_RATE(n) using a number of thresholds and parameters. The non-fuzzy decision making block, can use the following parameters: NBDL—Network buffer desired level and NRF—Network response factor. In this example DELTA_RATE(n)=[NBO(n)-NBDL]/NRF DELTA_RATE(n) is added (step 510), by adder 126, to the current network rate $R_N(n)$ to provide the next streaming rate $R_S(n+1)$.

The current network rate $R_N(n)$ can be estimated (step 501 of FIG. 6a) in various manners. For example, it may substantially equal a ratio between (a) the aggregate size of packets transmitted over the network during a predefined time window and (b) the length of that time window. Referring to FIG. 2, and assuming that a large enough time window was selected to include the transmission of the $(W-1)^{th}$ till the $(V-1)^{th}$ packets then $R_N(n)=[SIZE((W-1)^{th}$ packet)+ . . . +$SIZE((V-1)^{th}$ packet)]/$[TA_{(V-1)}-TA_{(W-1)}]$, whereas TA are the arrival time of the packets to the player buffer. It is noted that shorter time windows may be selected, and that other methods for estimating $R_N(n)$ are known.

The second process 131 (of FIG. 3) receives (step 522 of FIG. 6b) an input variable a difference ET(n) between a presentation time stamp of a media packet that was transmitted from the streamer buffer (usually the last media packet that was transmitted from the streamer packet) and between the transmission stamp of the media packet(TTS). Subtracting unit 130 performs the subtraction (step 522 of FIG. 6b) and provides ET(n). It is noted that ET(n) may also be responsive to buffering periods—periods in which the player device requested to receive packets but did not receive as the player buffer was empty.

The buffering periods can be estimated by comparing successive player reports to identify successive reports in which the last received packet remains the same.

Non-fuzzy decision making block (Denoted function 142) calculates DELTA_ENCODE(n) using a number of thresholds and parameters. For example the non-fuzzy decision making block can use two thresholds MAPLT—Maximal PTS less TTS and MIPLT—Minimal PTS less TTS. The non-fuzzy decision making block can use these equations to calculate DELTA_ENCODE(n):

(i) If ET(n) is bigger than MAPLT then DELTA_ENCODE(n)=1.
(ii) If ET(n) is smaller then MIPLT then DELTA_ENCODE(n)=−1.
(iii) Else DELTA_ENCODE(n)=0.

DELTA_ENCODE(n) and the next streaming rate $R_S(n+1)$ are provided to an encoding level block 146 (of FIG. 3) that determines (Step 530 of FIG. 6b) what shall be the next encoding level $R_E(n+1)$.

According to an embodiment of the invention $R_E(n+1)=R_S(n+1)+$DELTA_ENCODE(n). According to another embodiment the encoding level block 146 selects the encoding level, out of a set of possible levels, in response to said sum. This may include finding the best matching encoding level.

According to an embodiment of the invention the difference between $R_E(n+1)$ and $R_E(n)$ is limited. According to another embodiment of the invention the process may select between an encoding level out of a sequence of encoding levels. Once a certain encoding level is selected during a certain step the process cannot select during a consecutive step an encoding level that is too distant than that encoding level.

Second Embodiment

According to this embodiment a second control scheme is provided. This scheme is responsive to the occupancy of the player buffer. The occupancy can be in terms of aggregate packet size or in aggregate playing time associated with the packets.

Figure 4:
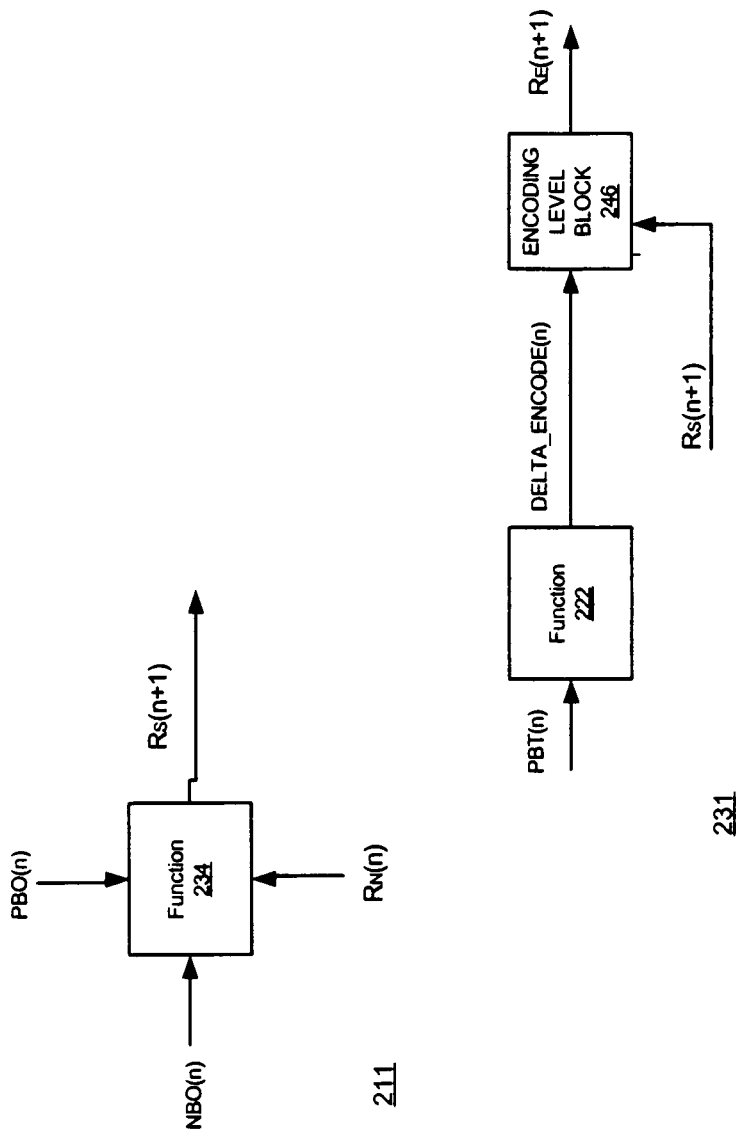
FIG. 4 is a detailed schematic illustration of non-fuzzy processes, in accordance with another embodiment of the invention.

The second control scheme includes two non-fuzzy processes, both are illustrated at FIG. 4.

The first process 211 of FIG. 4 receives (step 540 of FIG. 7a) as input the network buffer occupancy NBO(n), the network bit rate $R_N(n)$ and the player buffer occupancy PBO(n). It outputs an output representative of the next streaming rate.

The second process 231 of FIG. 4 receives as input the aggregate playing time of packets within the player buffer PBT(n) and outputs the encoding level of the media stream $R_E(n+1)$.

Figure 7A:
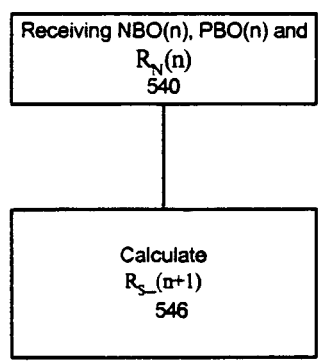

Referring back to the first process 211, non-fuzzy decision making block (denoted function 234) calculates the next streaming rate $R_S(n+1)$ using a number of thresholds and parameters (step 540 of FIG. 7a). The non-fuzzy decision making block 234 can use four parameters: NBDL—Network buffer desired level, NRF—Network response factor, PBML—player buffer maximal level and MEL—maximal encoding level. In this example: If (PBO(n)<NBDL) then $\{R_S(n+1)=R_N(n)+[NBO(n)-NBDL]/NRF\}$; Else, $\{R_S(n+1)=$ MIN $[(0.9*MEL), (R_N(n)+[NBO(n)-NBDL]/NRF)])\}$.

Figure 7B:
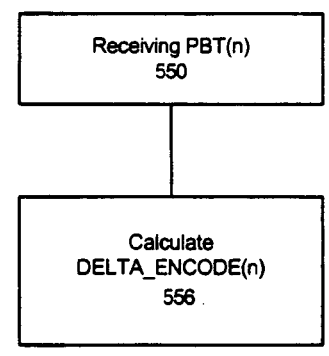

The second process 231 of FIG. 4 receives (step 550 of FIG. 7b) an input variable PBT(n) reflecting the aggregate playing time associated with packets that are stored in the player buffer. Referring to FIG. 2 this aggregate playing time may substantially equal $PTS_{W-1}-PTS_{V-1}$.

Non-fuzzy decision making block (referred to as function 222) calculates DELTA_ENCODE(n) using a number of thresholds and parameters. For example the function can use two thresholds MATIP—Maximal time in player buffer and MITIP—Minimal time in player buffer. The Non-fuzzy decision making block can use these equations to determine DELTA_ENCODE(n):

(i) If PBT(n) is bigger than MATIP then DELTA_ENCODE(n)=1.
(ii) If PBT(n) is smaller then MITIP then DELTA_ENCODE(n)=−1.
(iii) Else DELTA_ENCODE(n)=0.

DELTA_ENCODE(n) and the next streaming rate $R_S(n+1)$ are provided to an encoding level block 246 that determines what shall be the next encoding level $R_E(n+1)$.

According to an embodiment of the invention $R_E(n+1)=R_S(n+1)+\text{DELTA\_ENCODE}(n)$. According to another embodiment the encoding level block 246 selects the encoding level, out of a set of possible levels, in response to said sum.

Third Embodiment

In this embodiment the control scheme is responsive to the status of the streaming process and especially to whether the streaming process approached starts, ends or is in an intermediate state.

It is described in prior art "Reducing Broadcast Delay" By Bill Bimey, Microsoft Corporation, April 2003, found at http://www.microsoft.com/windows/windowsmedia/howto/articles/BroadcastDelay.as px when the streaming process begins it is desirable to allow a fast and smooth start of the presentation at the client device, rather than waiting till a certain amount (usually in terms of playing time) of media stream packets are stored in the player buffer, before initiating the presentation. This goal may be achieved by reducing the encoding level of the media stream at the beginning of the streaming process. This method is usually called "fast start" or "zero buffering".

This embodiment regards the end of the streaming process and regards the implementation of both the start and the end of the streaming process using the control scheme described below. Typically, when the streaming process ends, the player buffer still stores packets to be played. Thus, before the playing session ends the network is not used to convey media stream packets. In order to improve the utilization of the network, the amount of information that is transmitted may be increased. This increase can serve to improve the quality of the media stream, whereas said improvement can be allocated to media stream portions of various length. Assuming that a certain amount of information increment is provided than it may be used to improve the quality of certain media stream portions. This increment can be used to transfer higher quality media streams. The quality level as well as the length of the quality enhanced media stream may be increased. Higher quality level improvements are associated with shorter media stream portions (shorter time periods) and vise verse. It is desirable to have large information increments, for allowing improved media stream quality. Nevertheless, the amount of information increment is limited by the network capability, and especially whether the network can guarantee a transmission of relatively more information (higher bit rates) during extended periods.

In other words, by allocating more bits to the last packets of a media stream (or in other words, by increasing the encoding level of the media stream) the network is kept busy almost till the end of the playing process of the media stream packets at the player. Thus, the player buffer can be emptied towards the end of the streaming session, so that the network will be still used to transfer data/packets until the data is played almost in its entirety.

This can be achieved by modifying a target player buffer occupancy level and actually reducing said occupancy level towards the end of the streaming session. As a result of said target occupancy level reduction the "idle" period in which the network is not utilized for conveying media stream packets is reduced.

The player buffer occupancy level cannot be reduced to a point that there is a good chance of buffering due to fluctuations, or temporary reductions in the available network bandwidth.

The inventor found out that a tradeoff between possible buffering and utilization of possible bandwidth increment shall be found. This tradeoff depends upon the network stability as if there are almost no fluctuations the risk of buffering is low, even when the player buffer is almost empty for a long period. Another factor that must be taken into account is the length of time period during which the player buffer occupancy is low. Longer time periods may increase the risk of buffering.

The ability to effectively utilize any possible bandwidth increment may be based upon effective control schemes, such as those that are described below.

An advantage of this embodiment is the capability of utilizing the buffer occupancy levels to increase the effective bandwidth of the network that is allocated to the streaming process.

Stable networks allow better prediction of their capability to provide a certain bit rate during longer time periods. The 'control process takes into account a risk factor that reflects the stability of the network.

Figure 5:
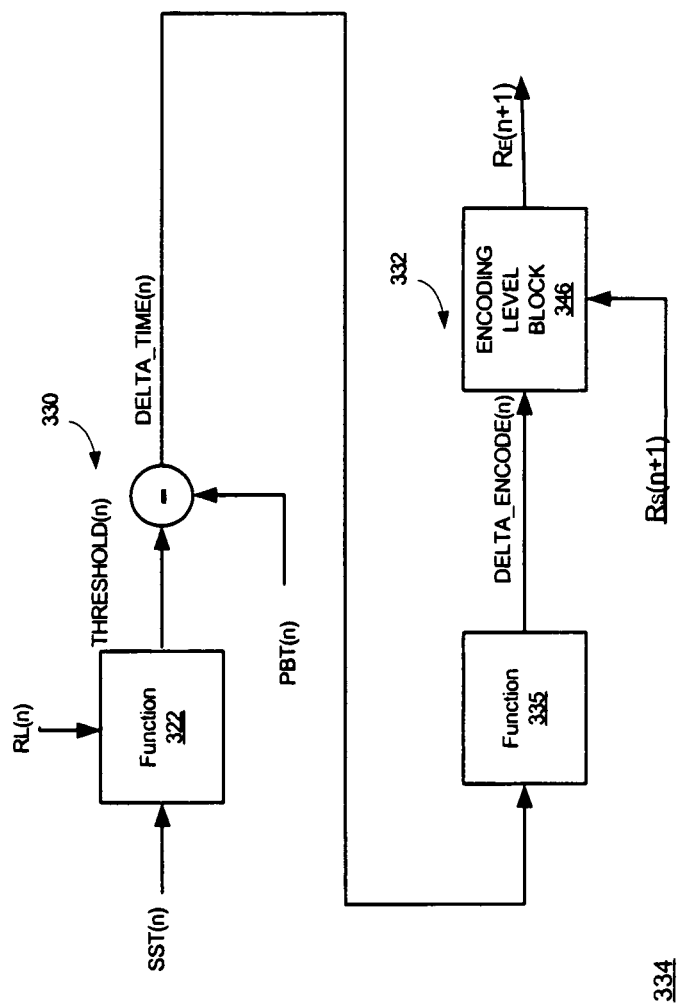
FIG. 5 is a detailed schematic illustration of non-fuzzy processes, in accordance with a further embodiment of the invention.

A sequence (denoted 334 in FIG. 5) of two processes (330 and 332) is used to determine the encoding level of a streaming media stream.

The first process 330 receives input variable SST(n) that reflects the status of the streaming process and as well as a risk level attribute RL(n) that reflects the network capability to stream media stream at certain rates, especially in a stable manner. Process 330 outputs an output TPBT(n) that represents a target aggregate playing time associated with packets that are stored in the player buffer.

TPBT(n) is used as an input into the second process 332 that outputs an output representative of the difference between the next streaming rate and a required encoding level.

Referring to FIG. 6, process 330 receives (step 562 of FIG. 11) as input variables SST(n) and RL(n). Non-fuzzy decision making block (denoted function 322) calculates THRESHOLD(n) using a number of thresholds and parameters.

RL(n) reflects a risk level responsive to the instability in the network bandwidth, and it can be is set as a function of the standard deviation of the available bit-rate. For example, RL is Low, if $\alpha_{bit\text{-}rate}<\text{Threshold}[RL]$ and RL is High, if $\alpha_{bit\text{-}rate}>=\text{ThresholdRL}$. The threshold ThresholdRL can be determined by experimentation. Its value can be determined by assigning various threshold values until underflow is minimized, while still keep results satisfactory.

Yet for a further example, in case the player buffer can contain T seconds of media stream, following relationship between the constants should be substantially maintained: TH_SL=15/20.*T; TH_SH=14/20.*T; TH_MH=13/20.*T; TH_mL=10/20.*T; TH_EH=5/20.*T and TH_EL=2/20.*T. Typically T=20 Seconds. START=a time reflecting the average player buffer occupancy in terms of playing time. A typical value in GPRS=5 seconds. END=may typically be equal to START. MIDDLE=all the session time except for the first START second and the last END number of seconds.

RL(n) can be measured by the standard deviation of the network throughput, in a case when the standard deviation is higher then a certain level RL(n) is equal to RL_High and when it is lower or equal then the threshold, RL(n) is equal to RL_Low.

Given these constants THRESHOLD(n) can be calculated by the following:

| SST(n) | RL(n) | THRESHOLD(n) |
|--------|--------|--------------|
| Start  | RL_Low  | TH_SL |
| Start  | RL_High | TH_SH |
| Middle | RL_Low  | TH_ML |
| Middle | RL_High | TH_MH |
| End    | RL_Low  | TH_EL |
| End    | RL_High | TH_EH |

Figure 8:
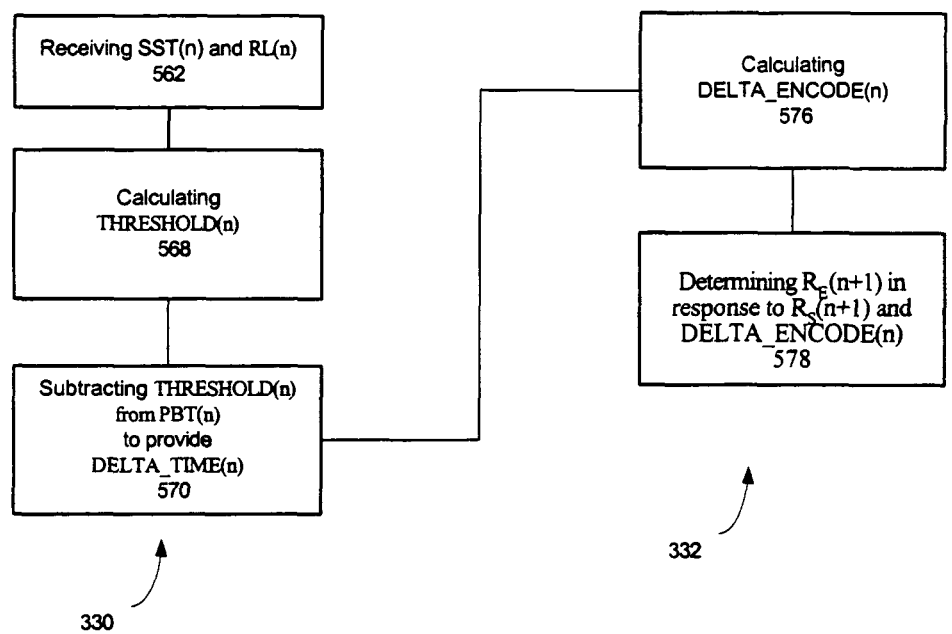

THRESHOLD(n) is subtracted (step 570 FIG. 8) from PBT(n) to provide an input variable DELTA_TIME(n).

DELTA_TIME(n) is provided to non-fuzzy decision making block (denoted function 335) that may apply various rule based decisions using a number of thresholds and parameters (step 570 FIG. 8), such as those described below:

If DELTA_TIME(n) is not smaller than DTMAT(n) then DELTA_ENCODE(n)=1.

(ii) If DELTA_TIME(n) is not bigger than DTMAT(n) then DELTA_ENCODE(n)=−1.

(iii) Else DELTA_ENCODE(n)=0.

Where DTMAT—is the delta time maximal threshold and DTMIT—is the delta time minimal threshold.

DELTA_ENCODE(n) and the next streaming rate $R_S(n+1)$ are provided to an encoding level block 246 that determines (step 578 FIG. 8) what shall be the next encoding level $R_E(n+1)$.

Additional Embodiments

According to another aspect of the invention additional information regarding the media stream can be provided to the control process mentioned above, or even to other control processes, in order to further optimize the propagation of content through a sequence of buffers.

According to this embodiment various media stream segments (such as different scenes) are initially processed to determine a target size of their compressed and/or encoded representation. The target size reflects a certain compression level. In response to said determination the media stream segments are then encoded. This two-staged process can be used for allocating more bits to segments that includes more information.

Assuming, for example, that a media stream is processed by a compression scheme such as one of the MPEG schemes. During a first processing step the media stream is analyzed.

During a second step the results of the analysis (such as media stream characteristics) are used for optimizing the media stream compression. The optimization may be responsive to various criteria such as media stream perceptual quality, media stream average quality level, allowed segment quality changes, and the like.

The results of the first step may include required (relative or absolute) bit size per media stream segment. One method for such multi step processing is described at "Two-pass MPEG-2 variable bitrate encoding", P. H. Westerink R. Rajagopalan C. A. Gonzales, IBM Journal of Research and Development, Volume 43(4), July 1999 which is incorporated herein by reference. Said article also discusses certain techniques to prevent player buffer overflow or underflow.

It is noted that the allocation of different bit amounts (rates) per scene can also take into account the smoothing properties of various buffers, such as the player buffer. The bit rate may fluctuate even in constant bit rate transmission, as long as the long-term average remaining substantially unchanged.

The flexible allocation of bit rate from one scene to another is limited by the available network bandwidth, and in many cases is limited by average bit rate requirements.

This flexible allocation of bit rate may facilitate allocating a larger amount of bit rates to a complex scene that is preceded by a simple scene.

According to an embodiment of the invention the results of the first pass and/or the processed representation of the media stream (after the second pass) may be used to determine player buffer target occupancy levels. For example, wherever the size of a certain frame is high the target player buffer occupancy level may be decreased, and vice verse.

The changes in the player buffer target occupancy level may also be responsive to the risk level associated with the network.

The alteration of target occupancy levels in response to the results of the first pass (or size of processed media stream after the second pass) can be useful when a complex frame or scene (or scene) is preceded by a simple frame or scene and wherein the timing of both frames or scenes allows the player buffer to store both frames or scenes.

According to another embodiment of the invention the control process may be further responsive to additional information reflecting the network policy rules/behavior. This additional information may reflect either input variables provided to the control processes or even the processes themselves. For example such an additional information may be used to update the network bit-rate variable.

The additional information may reflect bit rate allocation among different parts of the network. For example, a network management entity can allocate network bandwidth in response to end users buffer occupancy, network buffer occupancy level, end user priority and the like. Accordingly, network buffers that are maintained at a first occupancy level may be allocated more bandwidth than network buffers that are maintained at a different occupancy level.

The inventors found that the ability to influence the bandwidth allocation given by the network through controlling the network buffer, allows the network management entities to control the relative bandwidth allocation among group of users, while maintain some constraint or dependency among the allocations made to different users, for example, making sure that the total bandwidth will be essentially constant. This can be used for quality of service differentiation among different clients even if all use the same bandwidth as far as the agreement with the carrier goes.

The inventors have also found that by using two-pass encoding on a group of clients, the variable relative allocation can be used to temporarily allocate more bandwidth for transmitting certain scenes to a certain client in relation to another transmission aimed to another client. Said extended bandwidth allocation can be used for transmitting higher encoding level scenes.

We claim:

1. A method for determining at least one characteristic of a media stream, the method comprising:

monitoring, with a processor, a media stream propagating through at least three cascaded buffers;

providing status information reflecting a status of at least a third buffer and a second buffer of said at least three cascaded buffers; and applying at least one non-fuzzy process to determine the at least one characteristic of the media stream, in response to the status information, wherein at least one buffer of the at least three cascaded buffers reflects buffering properties of a network through which the media stream propagates.

2. The method of claim 1, wherein the media stream propagates through the network at a packetized foam.

3. The method of claim 2, wherein the media stream is associated with timing information that reflects media stream packet retrieval from at least one of the cascaded buffer.

4. The method of claim 2, wherein the status information reflects timing information associated with media stream portions stored within a second buffer or a third buffer.

5. The method of claim 2, wherein media stream packets are stored at a client device buffer and are retrieved according to timing information associated with these packets.

6. The method of claim 1, wherein
applying comprises receiving input information representative of an occupancy of the second buffer and
applying a non-fuzzy process to output information representative of a change in a retrieval rate out of the first buffer.

7. The method of claim 6, wherein the media stream is a packetized media stream and the retrieval rate out of the first buffer is a streaming rate of the packetized media stream.

8. The method of claim 1, wherein applying comprises receiving input information representative of an occupancy of the second buffer, of a retrieval rate of the second buffer and of an occupancy of the third buffer; and applying a non-fuzzy process to provide output information representative of a retrieval rate from the first buffer.

9. The method of claim 8, wherein the media stream is a packetized media stream and the retrieval rate out of the first buffer is a streaming rate of the packetized media stream.

10. The method of claim 1, wherein the network comprises a cellular network.

11. The method of claim 1, wherein the media stream is preprocessed prior a provision to the second cascaded buffer and wherein the at least one media stream characteristic comprises preprocessing characteristic.

12. The method of claim 1, wherein the at least one media stream characteristic is a media stream target bit rate, a media stream compression ratio or a media stream encoding level.

13. The method of claim 1, wherein the status information reflects a progress of media stream propagation across the cascaded buffers.

14. The method of claim 1, wherein applying comprises receiving input information relating to media stream portions that were retrieved from the first buffer and applying a non-fuzzy process to output information representing an encoding level of the media stream.

15. The method of claim 1, wherein applying comprises:
receiving input information representative of timing associated with a retrieval of media stream portions from the third buffer; and
applying a non-fuzzy process to provide an encoding level of the media stream portions.

16. The method of claim 1, wherein applying comprises:
receiving information representative of a progress of the propagation of the media stream, and of an ability to propagate the media stream through the cascaded buffers; and
applying a non-fuzzy process to provide output information reflecting timing information of media stream portions stored within the third buffer.

17. The method of claim 1, wherein applying comprises:
receiving input information reflecting timing information of media stream portions stored within the third buffer; and
applying a non-fuzzy process to provide output information representative of a difference between a retrieval rate out of the first buffer and an encoding level of the media stream.

18. The method of claim 1, further comprising analyzing the media stream, wherein applying the at least one non-fuzzy process is responsive to a result of the analysis.

19. A method for determining multiple media stream characteristics of a media stream, the method comprising:
monitoring, with a processor, a media stream that propagates through at least two cascaded buffers,
providing status information reflecting a status of the at least two cascaded buffers; and
applying at least one non-fuzzy process to determine multiple characteristics of the media stream, in response to the status information, wherein at least one cascaded buffer reflects buffering properties of a network through which the media stream propagates.

20. The method of claim 19, wherein the media stream propagates through the network at a packetized form.

21. The method of claim 20, wherein the media stream is associated with timing information that reflects media stream packet retrieval from at least one of the at least two cascaded buffers.

22. The method of claim 20, wherein media stream packets are stored at a client device buffer and are retrieved according to timing information associated with these the media stream packets.

23. The method of claim 19, wherein the network comprises a cellular network.

24. The method of claim 19, wherein the media stream is preprocessed prior a provision to the second cascaded buffer and wherein the at least one media stream characteristic comprises preprocessing characteristic.

25. The method of claim 19, wherein applying comprises receiving input information representative of an occupancy of the second buffer and applying a non-fuzzy process to output information representative of a change in a retrieval rate out of the first buffer.

26. The method of claim 19, wherein applying comprises receiving input information relating to media stream portions that were retrieved from the first buffer and applying a non-fuzzy process to output information representing an encoding level of the media stream.

27. The method of claim 19, wherein applying comprises:
receiving input information representative of an occupancy of the second buffer, of a retrieval rate of the second buffer and of an occupancy of the third buffer; and
applying a non-fuzzy process to provide output information representative of a retrieval rate from the first buffer.

28. The method of claim 19, wherein applying comprises:
receiving input information representative of timing associated with a retrieval of media stream portions from the third buffer; and
applying a non-fuzzy process to provide an encoding level of the media stream portions.

29. The method of claim 19, wherein applying comprises:
receiving information representative of a progress of the propagation of the media stream, and of an ability to propagate the media stream through the cascaded buffers; and
applying a non-fuzzy process to provide output information reflecting timing information of media stream portions stored within the third buffer.

30. The method of claim 19, wherein applying comprises:
receiving input information reflecting timing information of media stream portions stored within the third buffer; and applying a non-fuzzy process to provide output information representative of a difference between a retrieval rate out of the first buffer and an encoding level of the media stream.

31. A controller for determining at least one media stream characteristic of a media stream the controller comprising: a processor coupled to a memory configured to monitor a media stream propagating through at least three cascaded buffers;
- an interface configured to receive status information reflecting a status of at least a third buffer and a second buffer of the at least three cascaded buffers; and
- a non-fuzzy decision making block, coupled to the interface, configured to process the status information by applying a non-fuzzy process, to provide output representative of at least one media stream characteristic of the media stream, wherein at least one cascaded buffer reflects buffering properties of a network through which the media stream propagates.

32. The controller of claim 31, wherein the network comprises a cellular network.

33. The controller of claim 31, wherein the at least three cascaded buffers comprise a client device buffer.

34. The controller of claim 31, wherein the media stream is associated with timing information reflecting media stream portion retrieval from at least one of the at least three cascaded buffers.

35. The controller of claim 31, wherein the media stream is preprocessed prior a provision to the second cascaded buffer and wherein the at least one media stream characteristic comprises preprocessing characteristic.

36. A controller for determining multiple media stream characteristic of a media stream the controller comprising: a processor coupled to a memory configured to monitor a media stream propagating through at least two cascaded buffers;
- an interface configured to receive status information reflecting a status of at least a first and second buffers of the at least two cascaded buffers; and
- a non-fuzzy decision making block, coupled to the interface, for processing the status information to provide an output representative of multiple media stream characteristics of the media stream wherein at least one cascaded buffer reflects buffering properties of a network through which the media stream propagates.

37. The controller of claim 36, wherein the at least two cascaded buffers comprise a client device buffer.

38. The controller of claim 36, wherein the media stream is associated with timing information.

39. The controller of claim 36, wherein the media stream is preprocessed prior a provision to the first cascaded buffer.

40. The controller of claim 36, wherein the multiple media stream characteristics comprise preprocessing characteristic.

* * * * *

UNITED STATES PATENT AND TRADEMARK OFFICE
CERTIFICATE OF CORRECTION

PATENT NO.         : 8,862,758 B1                            Page 1 of 1
APPLICATION NO.    : 10/693036
DATED              : October 14, 2014
INVENTOR(S)        : Ziv Soferman and Yohay Falik It is certified that error appears in the above-identified patent and that said Letters Patent is hereby corrected as shown below:

On the title page:
In ITEM (73) Assignee:                    change "Kong," to --Kong--

In the claims:
CLAIM 22,   COLUMN 14,  LINE 24,   change "with these" to --with--
CLAIM 36,   COLUMN 16,  LINE 6,    change "stream the" to --stream, the--

Signed and Sealed this
Thirty-first Day of March, 2015

Michelle K. Lee
*Director of the United States Patent and Trademark Office*